United States Patent [19]
Egres, Jr.

[11] Patent Number: 6,016,848
[45] Date of Patent: Jan. 25, 2000

[54] FLUOROPOLYMER TUBES AND METHODS OF MAKING SAME

[75] Inventor: Ronald G. Egres, Jr., Elkton, Md.

[73] Assignee: W. L. Gore & Associates, Inc., Newark, Del.

[21] Appl. No.: 08/824,241

[22] Filed: Mar. 25, 1997

Related U.S. Application Data

[63] Continuation-in-part of application No. 08/682,037, Jul. 16, 1996, abandoned.

[51] Int. Cl.[7] .............................. F16L 11/04; F16L 9/18
[52] U.S. Cl. ............................................. 138/137; 138/109
[58] Field of Search .............................. 123/468; 60/272; 55/159; 138/137, 109, 125; 264/573, 209.1; 174/36; 392/472; 623/1; 525/58; 521/81

[56] References Cited

U.S. PATENT DOCUMENTS

| | | | |
|---|---|---|---|
| 3,676,566 | 7/1972 | McBride | 174/36 |
| 4,267,863 | 5/1981 | Burelle | 138/109 |
| 4,587,075 | 5/1986 | Butcher et al. | 264/573 |
| 4,787,921 | 11/1988 | Shibata et al. | 55/159 |
| 4,973,609 | 11/1990 | Browne | 521/81 |
| 5,163,289 | 11/1992 | Bainbridge | 60/272 |
| 5,223,571 | 6/1993 | Igarashi et al. | 525/58 |
| 5,232,645 | 8/1993 | Ramos, Jr. | 138/125 |
| 5,381,511 | 1/1995 | Bahar et al. | 392/472 |
| 5,433,909 | 7/1995 | Martakos et al. | 264/209.1 |
| 5,476,080 | 12/1995 | Brunnhofer | 123/468 |
| 5,499,661 | 3/1996 | Odru et al. | 138/125 |
| 5,628,786 | 5/1997 | Banas et al. | 623/1 |
| 5,639,528 | 6/1997 | Feit et al. | 138/125 |
| 5,653,266 | 8/1997 | Reynolds et al. | 138/137 |
| 5,706,865 | 1/1998 | Douchet | 138/125 |

FOREIGN PATENT DOCUMENTS

| | | | |
|---|---|---|---|
| 38 20 866 | 12/1989 | Germany | F16L 9/12 |
| 1 479 000 | 7/1977 | United Kingdom | F16L 11/08 |

*Primary Examiner*—Andres Kashnikow
*Assistant Examiner*—Davis Hwu
*Attorney, Agent, or Firm*—Allan M. Wheatcraft

[57] ABSTRACT

The present invention relates to fluoropolymer tubes which exhibit excellent properties such as strength, wear resistance and dimensional stability when subjected to repeated flexing due to vibration, bending, or the like.

33 Claims, 13 Drawing Sheets

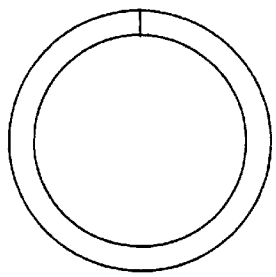
FIG. IA
PRIOR ART
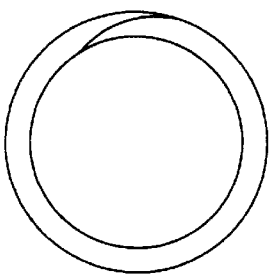
FIG. IB
PRIOR ART
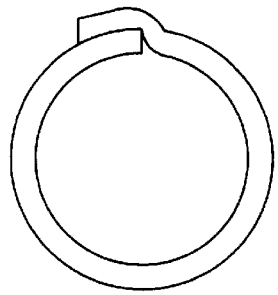
FIG. IC
PRIOR ART
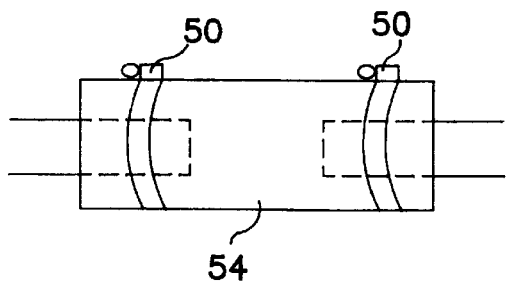
FIG. 2A
PRIOR ART
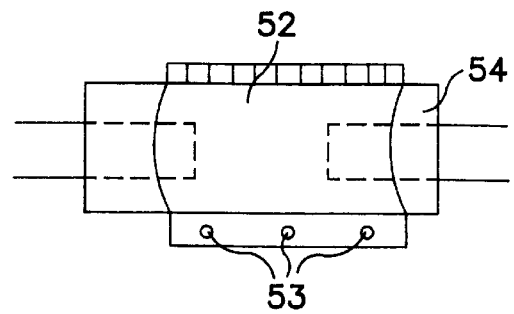
FIG. 2B
PRIOR ART

FLUOROPOLYMER TUBES AND METHODS OF MAKING SAME

RELATED APPLICATIONS

The present application is a continuation-in-part of copending U.S. patent application Ser. No. 08/682,037 filed Jul. 16, 1996.

BACKGROUND OF THE INVENTION

1. Field of the Invention

The present invention relates to flexible fluoropolymer tubes which exhibit excellent properties such as strength, wear resistance and dimensional stability when subjected to repeated flexing due to vibration, bending, or the like.

2. Description of Related Art

Polytetrafluoroethylene (PTFE) has demonstrated utility in many areas. As an industrial material, such as for gasketing or tubing material, PTFE has exhibited excellent utility in harsh chemical environments which normally degrade many conventional metals and polymeric materials. The non-reactive nature of PTFE maintains purity during use in articles fabricated therefrom, because such PTFE articles typically containing no plasticizers, fillers, stabilizers or anti-oxidants that could leach out and react with process fluids, powders, or manufactured components from high value industries including semiconductor fabrication processes and pharmaceutical production. PTFE is also usable over a broad temperature range, from as high as about 280° C., or higher, to as low as about −273° C.

Tubes of PTFE have been fabricated by a variety of methods. Typically, PTFE tubes are manufactured via paste extrusion in the presence of an organic lubricant, followed by lubricant removal, amorphously locking at temperatures above the crystalline melt point of PTFE, and further processing. U.S. Pat. No. 4,267,863 to Burelle and U.S. Pat. No. 3,225,129 to Taylor et al. discuss the fabrication of rigid, non-porous PTFE tubes by winding thin, calendered PTFE tapes onto a metal mandrel, followed by heating the layered tape tube to a temperature above the crystalline melt of PTFE for a time sufficient to achieve intra-layer adhesion. Moreover, large diameter tubes can be molded directly or machined from molded rods produced from granular PTFE resins. PTFE tubes fabricated using the aforementioned techniques have shown utility as liners for expansion joints, as described in, for example, U.S. Pat. No. 4,536,018 to Patarcity. Such conventional non-porous PTFE tubes fabricated through extrusion, tape winding, or compression molding exhibit poor mechanical properties, such as poor flexibility, low tensile strength, and low flexural strength. Accordingly, despite a number of highly desirable performance characteristics, the use of conventional non-porous PTFE tubes is generally limited to applications requiring only limited flexibility.

Flexural stresses applied to tubular components, particularly those stresses experienced under repeated bending or rapid axial compression and recovery resulting from cyclic movement or vibration of apparatus onto which the tube is coupled, are a particular problem for conventional non-porous PTFE is and PTFE composite tubes. Specifically, these materials typically weaken as a result of flexural stress and/or abrasion associated with the continuous axially oriented flexing or folding, which leads to the development of cracks and flaws in the tube and eventually results in catastrophic failure of the tube.

Polytetrafluoroethylene may be produced in a porous, expanded form as taught in U.S. Pat. Nos. 3,953,566, 3,962,153, and 4,187,390 to Gore. The membranes and tubes described therein have a microstructure comprised of nodes interconnected by fibrils. The formation of tubes is carried out by extruding a mixture of PTFE and liquid lubricant, removing lubricant from the resulting tubular extrudate and expanding the extrudate by stretching at a suitable rate at a temperature between about 100° C. and 325° C. The resulting tube may preferably be subjected to amorphous locking while the tube is longitudinally restrained. This processing creates desirable orientation of the material and, correspondingly, strength, primarily in the longitudinal direction. However, for applications requiring hoop strength or burst strength, such as those experiencing high internal pressure, these tubes often may not include sufficient circumferential wall strength to meet desired performance needs.

Tubes formed from sheets of stacked layers of expanded PTFE have been formed by conventional tube seaming sealing techniques, such as end-to-end butting and sealing, skiving of ends to seal, and overlapping of ends to form a seam, such as shown in FIGS. 1A, 1B and 1C, respectively. The ends are joined by any conventional sealing technique, such as by the use of an adhesive, by densifying and melting the ends together, or the like. One example of tubes formed by skiving the ends of a flat sheet and bonding the skived ends with an adhesive to form a seamed tube are the tubes commercially available from Helms Industrial Supply, Inc., and fabricated from flat sheets of stacked expanded PTFE layers sold by W. L. Gore & Associates, Inc. (Elkton, Md.), as GR SHEET® gasketing material.

These tubes have been incorporated as pipe connectors in industrial systems, whereby the seamed tubes are placed between two pipes and affixed, such as by clamping, on the ends of the pipes. Two exemplary configurations of this set-up showing hose clamps 50 and a pipe coupling 52 having bolts 53, to clamp onto and hold the tube 54 in place, respectively, are shown in FIGS. 2A and 2B.

Membranes of porous expanded PTFE having uniaxially, biaxially, or multi-axially oriented fibrils as described in the aforementioned U.S. Patents to Gore have also been used in the fabrication of porous tubes by winding expanded PTFE membranes onto a mandrel at a temperature above the crystalline melt temperature of the PTFE for a period of time to achieve adhesion of the layers. Such wrapping may be carried out as, for example, an external helical wrap onto the expanded PTFE tubing described above to increase the hoop strength, such as is commercially available from W. L. Gore & Associates, Inc. (Flagstaff, Ariz.), as vascular grafts sold under the trade name GORE-TEX®, or as a wrapped layer between an inner and outer expanded tube as disclosed in, for example, U.S. Pat. No. 4,787,921 to Shibata.

Expanded PTFE wound tubing and composite tubing produced in the aforementioned ways have been deemed advantageous for possessing strength in both the longitudinal and circumferential directions, diametrical flexibility, thin wall thicknesses of up to 0.25 mm and small diameters of up to 25.4 mm, and for achieving collapsibility. These tubes have been found to be suitable in such diverse areas as intraluminal vascular grafts, filter elements, or catheters as described in PCT Publication No. WO 95/0555, gastroscope introducers as described in EPO Publication No. 0 605 243, and for gas permeation in applications such as degassing tubes as described in U.S. Pat. No. 4,787,921 to Shibata.

Although the prior art tubular articles work well in the applications for which they were intended, the prior art fails to teach the improved tubes of the present invention which provide novel utility in a variety of industrial applications requiring high flex life, high strength, high thermal and chemical resistance, and high purity.

Accordingly, it is a primary purpose of the present invention to provide novel tubes comprising expanded PTFE which exhibit enhanced flex life compared to conventional flexible tubing materials.

It is a further purpose of the present invention to provide novel tubes comprising expanded PTFE which exhibit enhanced flex life while having wall thicknesses and diameters which were heretofore unachievable based upon the teachings of the prior art.

It is a further purpose of the present invention to provide novel tubes comprising expanded PTFE which incorporate surface textures, such as corrugations and the like, to provide enhanced performance in a wide variety of applications.

It is a further purpose of the present invention to provide novel production techniques for fabricating the novel tubes of the present invention.

These and other purposes of the present invention will be apparent based on the following description.

SUMMARY OF THE INVENTION

The present invention is a flexible tube comprising expanded PTFE and exhibiting excellent tensile and flexural strength, dimensional stability, chemical inertness and utility at temperatures as high as about 280° C., or higher, and as low as near −273° C. Moreover, the present invention provides novel techniques for fabricating such tubes, whereby, for example, the tube is removable from the mandrel by the application of a flow or burst of gas to separate the tube from the mandrel, the tube may be shaped by blowing the tube from the mandrel into a mold, or the like.

A preferred application for the novel flexible tubes of the present invention is as a connection between two or more members, such as pipes or the like. For example, the novel flexible fluoropolymer tubes may be placed about the periphery of a tubular member, such as a pipe, having an outer diameter equal to or smaller than the inner diameter of the flexible tube. Alternatively, the tube may optionally be stretched diametrically to fit about pipes having diameters greater than the internal diameter of said tube. Alternatively, the tubes may be provided with flared ends to allow attachment with standard pipe flanges or the like. Moreover, it is contemplated that alternate means of connection using the novel tubes of the present invention are also encompassed by the present invention. For example, the two or more elements to be connected with the flexible tube of the present invention may be substantially butted adjacent one another or may be spaced apart, either in line with one another or at some angle relative to one another, depending on the desired configuration of the final assembly.

The flexible tubes of the present invention may be used in a variety of industrial applications, including flexible connections or couplings for connecting two conduits, ducts or pipe sections for the transport of gases, liquids, powders, granular materials, and the like. As compared to conventionally available connectors, the flexible tubes exhibit enhanced performance in applications between components of vibrating bulk solids transport equipment, screening and separation equipment, fluidized bed dryers and other processing equipment in which strong, non-contaminating tubular connections possessing excellent flex-life are desirable.

In a further embodiment of the present invention, the novel, flexible tubes of the present invention may be used as protective coverings on, for example, mechanical components to protect such components from thermal, chemical, mechanical, and other environmental stresses. For example, the flexible tubes of the present invention may be used as covers for hydraulic or pneumatic cylinder rods which undergo axial flexing during use, or alternatively, as covers for industrial and automotive mechanical joints undergoing angular bending or twisting motion. The flexible tubes of the present invention may also exhibit utility in non-dynamic applications, such as compressor, engine intake and exhaust manifold connections and fan duct connections. Further applications for the novel tubes of the present invention include use as inner linings for pipe or tubing sections, or as tubular gasket material about the peripheries of abutted pipes, the tubes being compressed against the pipe walls by any suitable means, such as hose clamps, metal or plastic compression pipe couplings or the like.

The flexible tube of the present invention may be formed in virtually any size and cross-sectional dimension of importance to industrial applications, and may comprise any porous fluoropolymer membrane which provides the performance characteristics required. In a particularly preferred embodiment, the novel tubes comprise porous expanded PTFE membranes or combinations of expanded PTFE membranes produced by methods described in, for example, U.S. Pat. Nos. 3,953,566, 3,962,153, and 4,187,390 to Gore.

Tube fabrication includes the wrapping of the porous fluoropolymer membrane about a cylindrical mandrel capable of withstanding temperatures up to as high as, for example, the crystalline melt point of PTFE, or higher. The porous fluoropolymer membrane may be of any desired thickness, width, etc., and preferably has a microstructure comprised of nodes and fibrils, wherein the fibrils are oriented in either a single direction or multiple directions.

In a further embodiment, the novel tubes of the present invention may be shaped to incorporate unique geometries, such as conical, frustum, or other geometries, and may also be shaped to include corrugations or other desirable surface geometries in at least a portion of the tubes.

DESCRIPTION OF THE DRAWINGS

The detailed description of the present invention will be better understood when read in conjunction with the appended drawings. For purposes of illustrating the invention, there are shown in the drawings embodiments which are presently preferred. It should be understood, however, that the invention is not limited to the precise arrangements and instrumentalities shown. In the drawings:

FIG. 1A–1C are cross-sectional views of prior art tubes incorporating various seam sealing configurations to form the tubes;

FIGS. 2A and 2B are side views of prior art tubes, such as those shown in FIG. 1, used as pipe connectors, wherein the tubes are affixed to the pipes by hose clamps and a pipe coupling, respectively;

DETAILED DESCRIPTION OF THE INVENTION

Figure 3:
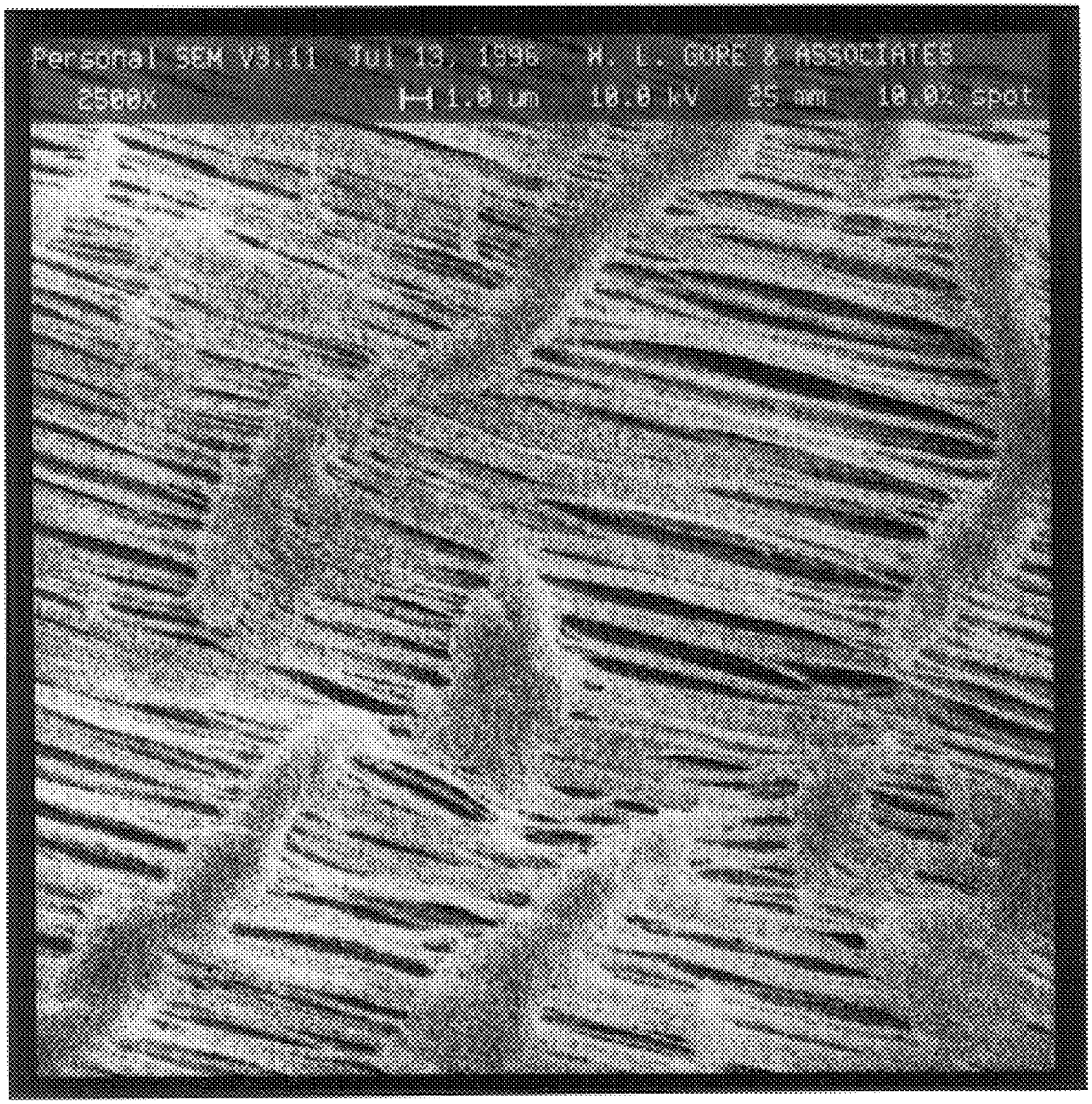
FIG. 3 is a scanning electron photomicrograph at 2500× of a longitudinally oriented expanded PTFE membrane having a node and fibril structure.

The present invention is directed to a flexible fluoropolymer tube exhibiting excellent tensile and flexural strength, dimensional stability, chemical inertness and utility at temperatures as high as about 280° C., or higher, and as low as near −273° C., in sizes and configurations which were heretofore unachievable based on the teachings of the prior art. Moreover, the present invention provides novel techniques for fabricating such tubes. For example, the tube may be removed from the mandrel by the application of a flow or burst of gas to separate the tube from the mandrel. Moreover, novel shaping techniques permit the formation of unique geometries ranging from conical to bellows configurations, and wherein the novel tubes have any number of desirable surfaces, such as corrugations, surface textures and the like.

The novel flexible tubes of the present invention may be fabricated from fluoropolymer materials which exhibit the desired performance characteristics described above. In a particularly preferred embodiment of the present invention, the novel fluoropolymer tubes are fabricated from a porous expanded polytetrafluoroethylene (PTFE) membrane, such as that taught in, for example, U.S. Pat. Nos. 3,953,566, 3,962,153, and 4,187,390 to Gore, all of which are incorporated by reference herein in their entireties.

The porous expanded PTFE may be filled with particulate fillers, coated on one or more surfaces, or impregnated throughout at least a portion of the thickness of the membrane with polymeric materials prior to or during formation. Additionally, other components (e.g. sheet or film elements, reinforcement ribs, etc.) may be readily incorporated with the expanded PTFE membranes used to form the flexible tubes of the present invention.

The fluoropolymer tubes of the present invention, preferably comprising expanded PTFE, may be filled with various fillers presently used to fill expanded microporous PTFE films, such as taught in U.S. Pat. No. 4,096,227 to Gore and U.S. Pat. No. 4,985,296 to Mortimer, Jr., incorporated herein in their entireties by reference. Suitable particulate fillers may include, for example, inorganic materials such as metals, semi-metals, metal oxides, glass, ceramics, catalysts and the like. Alternatively, other suitable particulate fillers may include, for example, organic materials selected from activated carbon, carbon black, polymeric resins such as ion exchange resins, indicator chemicals that undergo a change in color in the presence of other substances, and the like. Moreover, if a conductive filler is used to fill the expanded PTFE membrane and is present in a sufficient amount, the membrane, and thus the tubing itself, may exhibit static dissipative or conductive properties.

The term 'static dissipative' as used herein is intended to include any material with a volume resistivity of less than $10^9$ and greater than $10^2$ ohm cm, as determined by ASTM D 257-90. The term "conductive" as used herein is intended to include any material having a volume resistivity of $10^2$ ohm cm or less as determined by ASTM D257-90. "Particulate" is defined herein to mean individual particles of any aspect ratio including powders, fibers, etc.

Figure 4:
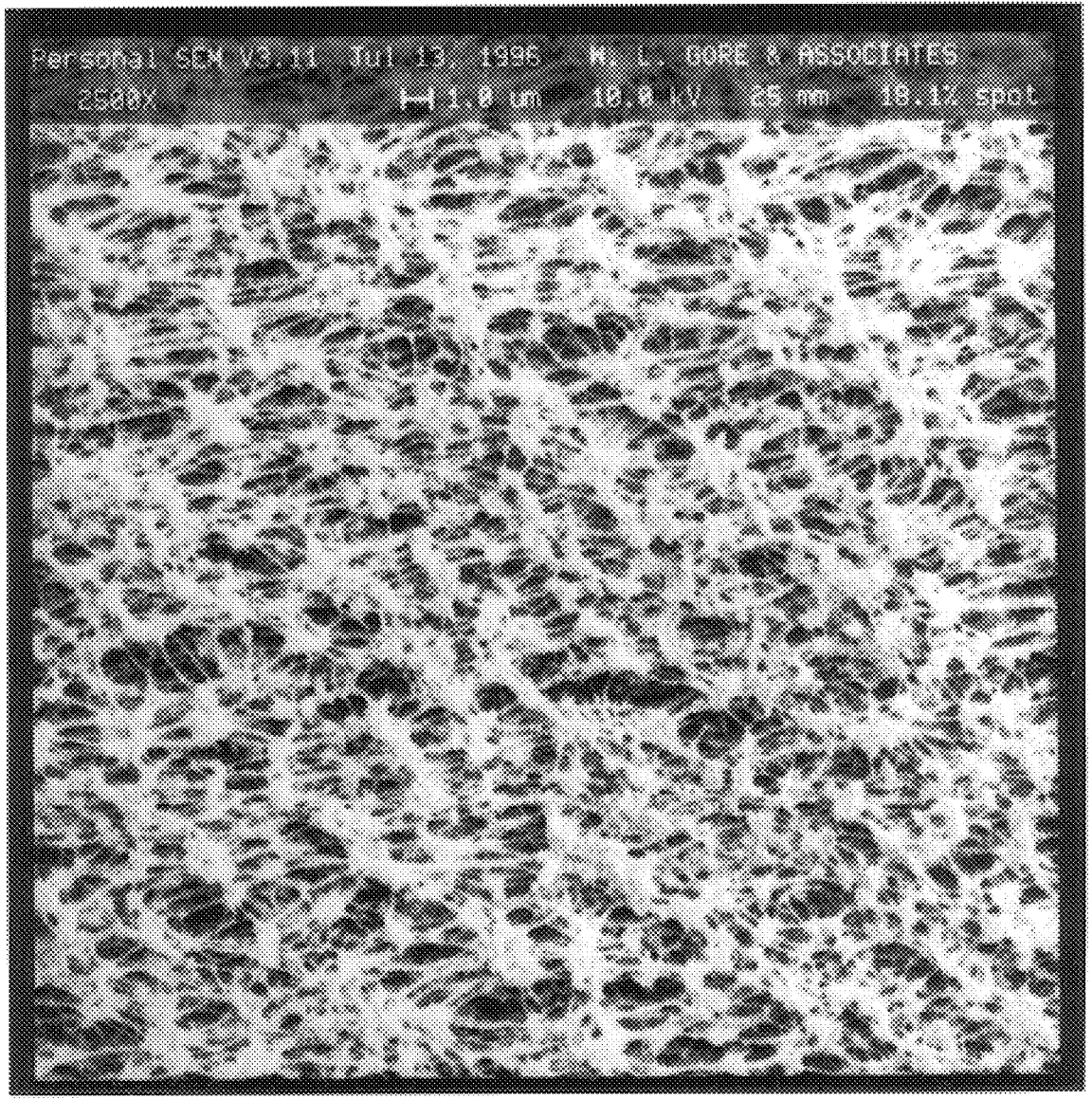
FIG. 4 is a scanning electron photomicrograph at 2500× of a bi-axially oriented expanded PTFE membrane having a node and fibril structure.
Figure 5:
FIG. 5 is a scanning electron photomicrograph at 1000× of a multiaxially oriented expanded PTFE membrane having a node and fibril structure.

The tubes of the present invention may be fabricated from expanded PTFE which has been expanded mono-axially, bi-axially or multi-axially, depending on the desired performance of the resulting flexible tubes. FIG. 3 shows a scanning electron photomicrograph at 2500× of a longitudinally (i.e., mono-axially) oriented expanded PTFE membrane having a node and fibril structure. Moreover, FIG. 4 is a scanning electron photomicrograph at 2500× of a bi-axially oriented expanded PTFE membrane having a node and fibril structure. Further, FIG. 5 is a scanning electron photomicrograph at 1000× of a multi-axially oriented expanded PTFE membrane having a node and fibril structure.

Figure 6:
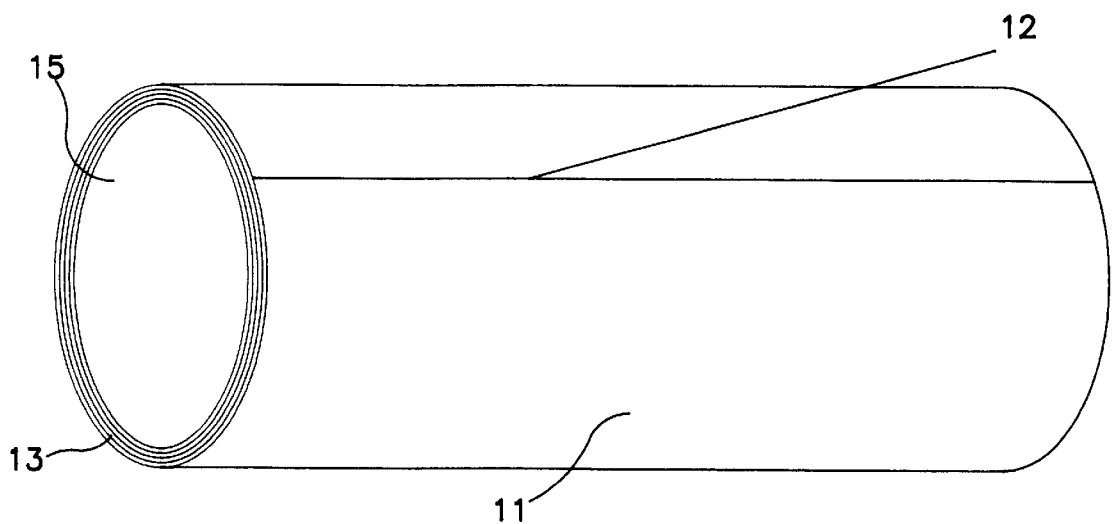
FIG. 6 is a perspective view of one embodiment of the present invention showing a longitudinally oriented exposed edge of the outer wrap of membrane.

In a particularly preferred embodiment of the present invention, as shown in FIG. 6, a flexible fluoropolymer tube is produced by wrapping bi-axially expanded PTFE membrane 11 in a coil fashion with the sides of the layers 13 layered one on top of another about the mandrel 15, ending with the edge 12 of the outer layer of film oriented longitudinally along the exterior of the tube. The multiple layers of the tube are preferably at least partially adhered to one another to minimize delamination during use. One preferred technique for adhering the layers is by heating, as described below. Depending upon the desired final configuration of the tube, it may be desirable to hold the layers of porous film substantially in place by clamping or the like against the periphery of the mandrel to prevent the expanded PTFE membrane from shrinking in the axial direction during the heating cycle. The film-wrapped mandrel is then heated to a temperature above the crystalline melting point of expanded PTFE for a period of time sufficient to obtain at least some coalescence of the nodes and fibrils at the surface interface of each of the expanded PTFE layers, resulting in adhesion of the film layers.

The degree to which the expanded PTFE layers adhere to one another is dependent upon the temperature(s) that the expanded PTFE membrane is exposed to and the duration of time the membrane is heated, whether prior to, during or after formation of the flexible tube. Preferred expanded PTFE membranes are typically those which have not been heated to temperatures above the crystalline melting point of the expanded PTFE prior to tube construction on the mandrel. The formed tube may then be heated to a temperature in excess of about 327° C., resulting in amorphous locking as described in U.S. Pat. No. 3,953,566 to Gore. Alternatively, the expanded microporous PTFE may be subjected to such amorphous locking prior to wrapping onto the mandrel. Heating of the expanded PTFE may be carried out in, for example, a hot air convection oven, a radiant heat oven, a molten salt bath or any other heating means capable of achieving temperatures necessary to produce adhesion between the layers of expanded PTFE membrane.

Figure 7:
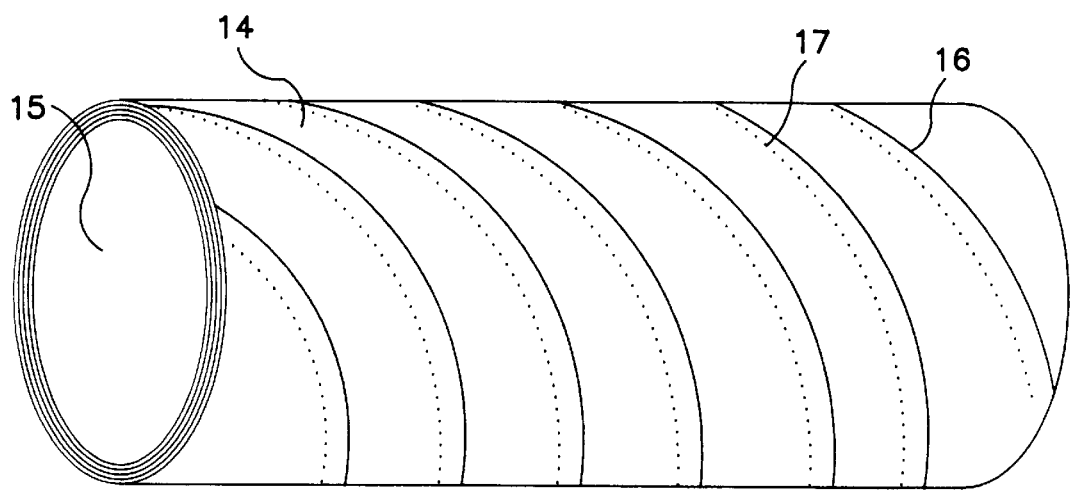
FIG. 7 is a perspective view of another embodiment of the present invention showing a helically oriented exposed edge of the outer wrap of membrane.

In an alternative embodiment of the present invention, as shown in FIG. 7, tubes may be created by helically winding a strip of membrane 14 about a mandrel 15 and overlapping adjacent edges of the membrane 17 to create a helically oriented edge 16 of the outer layer of membrane. Multiple layers of membrane may be wound to achieve any desired tube wall thickness. The film-wrapped mandrel may then be prepared and heated as described above to achieve membrane adhesion.

In a further embodiment, the tubes of the present invention may be fabricated by combining the above-described techniques. For example, tubes may be fabricated by combining a helically wrapped interior and a coil, or longitudinally, wrapped exterior, a coil wrapped interior and a helically wrapped exterior, an interior and exterior consisting of coil wrapped film, and a middle region of helically wrapped film, or virtually any number of combinations of such wrapping techniques.

In prior art tube constructions made from wrapped expanded PTFE membranes, it has been observed that upon heating, the inner surface of the tube typically may become adhered to the surface of the mandrel as a result of the tightening of the wrapped membrane and of the adhesive properties of the expanded PTFE when heated to temperatures above its melt point. The adhesion of the expanded PTFE membrane to the mandrel appeared to become a greater problem as the number of layers of membrane increased to produce tubes with greater wall thickness. Moreover, the adhesion to the mandrel appeared to be a greater problem as the surface area of membrane contacting the mandrel surface increased. The adhesion/friction of the tube on the mandrel when removing the tube from the mandrel may be readily overcome for small diameter, thin wall tubes. Thus, prior art tube constructions of expanded PTFE membrane wrapped about a mandrel were limited to sizes up to 25.4 mm in inner diameter and with wall thickness of up to 0.25 mm. However, in prior art attempts to form thicker walled tubes and/or tubes having comparatively larger diameters by wrapping expanded PTFE membrane about a mandrel, the adhesion/friction forces tended to increase to the point that it was impossible to remove the tube from the mandrel without damaging the tube.

Figure 8:
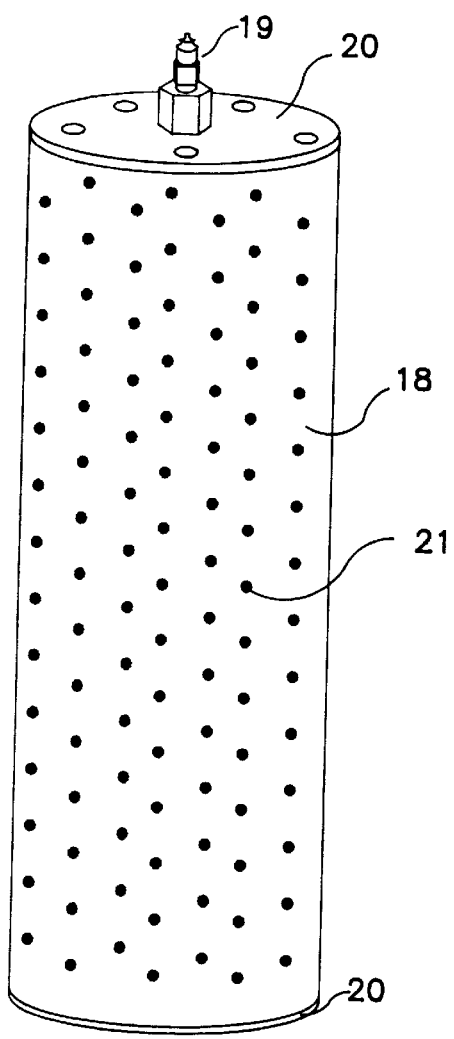
FIG. 8 is a perspective view of the perforated mandrel onto which the porous fluoropolymer membrane is wound.
Figure 9:
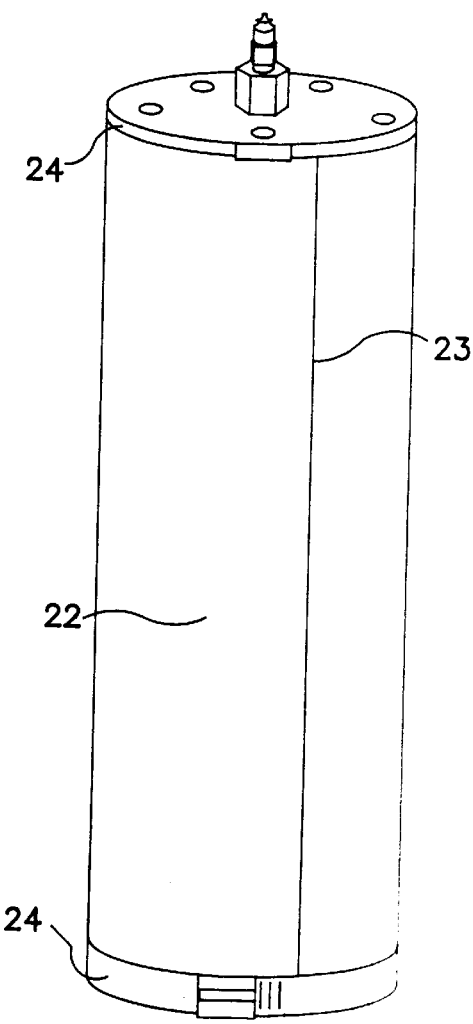
FIG. 9 is a perspective view of a membrane-wrapped mandrel with hose clamps attached at the ends to hold the layered membrane during a heating cycle.

A novel, preferred technique in the fabrication of the tubes of the present invention is the use of a porous or perforated mandrel and the use of air pressure to force or burst the interior tube wall free from the surface of the mandrel. FIG. 8 shows one embodiment of the assembly for removing the tube from the mandrel, in which a mandrel fabricated from a pipe 18 has holes 21 distributed over the surface of the mandrel to permit pressurized gas to flow between the surface of mandrel and the inner surface of the expanded PTFE membrane wrapped tube. End caps 20 are attached to the ends of the mandrel through welding or the like to provide an air-tight seal. In one of the end caps a hole is provided for the attachment of a port or coupling 19. FIG. 9 shows the mandrel of FIG. 8 having a fluoropolymer membrane coil 22 wrapped around the mandrel with the edge 23 of the outer layer of membrane oriented longitudinally along the exterior of the tube. Hose clamps 24 hold the fluoropolymer membrane during the heating cycle. A pressurized gas line, such as an air line, may be attached to the coupling, allowing pressurized air to enter the interior of the mandrel to provide the necessary internal air pressure required to overcome both the constrictive forces of the layers of expanded PTFE membrane and the adhesive bonding of the inner layer of membrane on the surface of the mandrel following the heating cycle. Alternatively, the mandrel may be equipped with alternate means for providing air to separate the tube from the mandrel. For example, a gas (e.g., air) may be blown down the interior length of the tube from a source at one or more ends of the tube/mandrel assembly.

The resulting tube may comprise an at least partially porous construction resulting from the porous nature of the expanded PTFE membrane from which it is made. If a non-porous tube is desired, the PTFE membrane wrapped tube may be heated above the crystalline melt temperature of the PTFE for a time sufficient to cause shrinkage of the porous expanded PTFE membrane until the desired amount of porosity or substantially no porosity remains. The resulting densified expanded PTFE materials will exhibit remnants of a node and fibril structure, as evidenced by Different Scanning Calorimetry (DSC) peaks at 327° C. and 380° C. in the course of a temperature rise of 10° C./min.

For DSC analysis of materials herein, a thermal analysis of a sample is determined through the use of a Differential Scanning Calorimeter. Approximately 10 mg of a sample is placed into the Differential Scanning Calorimeter and the temperature of the sample is increased from 200° C. to 400° C. at a scan rate of 10° C./min.

Alternatively, compression of the layers of expanded PTFE, whether at, below or above ambient temperature, prior to, during or after the heating step described above can greatly assist in the removal of porosity within the tube wall. This compression may be achieved, for example, with a compression roller pressed against the expanded PTFE material, or any other suitable compression means which decreases porosity within the membrane layers.

The present invention enables the formation of flexible fluoropolymer wrapped tubes of thicknesses and diameters which were heretofore unachievable based upon the teachings of the prior art. For example, wall thicknesses greater than 0.25 mm, and tube inner diameters of greater than 25.4 mm, and even larger, which are not taught or achieved in the prior art, are achievable in the present invention. Preferred wall thicknesses may range from greater than 0.25 mm up to 1 mm, up to 2 mm, up to 5 m, and up to 10 mm or higher. Preferred tube inner diameters may range from greater than 25.4 mm, up to 51 mm, up to 76 mm, up to 101 mm, up to 127 mm, up to 152 mm, up to 203 mm, and up to 254 mm or greater.

As an alternative to using a perforated mandrel and air pressure to aid in the removal of the PTFE membrane tube, a collapsible mandrel may also be used, which allows a reduction in the circumference or perimeter which is adequate to assist in the removal of the tube from the mandrel. For example, the collapsible mandrel may be in the form of a coil of metal sheet upon which the expanded PTFE membrane is wrapped. After the heating cycle, the outer diameter of the coil can be reduced to aid in removal of the expanded PTFE wrapped tube. Alternatively, a segmented, collapsible mandrel, or other comparable geometry or configuration of collapsible mandrel, may be used.

In a further embodiment of the present invention, one or more layers of one or more second material having a composition or configuration different from the fluoropolymer membrane layer may be incorporated into the tubes of the present invention. For example, an alternate means for obtaining at least partial adhering of the layers of the fluoropolymer membrane layers is to use an adhesive to achieve intra-layer bonding of the layers of the porous fluoropolymer membrane. One suitable class of adhesives may be of the form of thermoplastic polymer films having a lower melt point than the crystalline melt point of the expanded fluoropolymer membrane. The thermoplastic film may be wound with at least a portion of the expanded PTFE membrane onto the mandrel in such a fashion that it contacts adjacent layers of membrane. Alternatively, the fluoropolymer membrane may be provided with a coating of adhesive on only one surface thereof. Such adhesive-coated membranes may be oriented during wrapping around the mandrel so that the adhesive-coated side of the membrane faces away from the surface of the mandrel and, therefore, contacts only adjacent layers of membrane without contacting the mandrel. The adhesive may be in the form of either a continuous or a discontinuous coating. While thermoplastic fluoropolymers such as, for example, FEP or PFA, are preferred in the present invention, other high temperature resistant or chemically resistant polymers such as liquid crystal polymers or polyetheretherketone may also be used. Alternatively, other materials including polypropylene, polyethylene terephthalate, polymethylmethacrylate, polycarbonate, and the like, may provide good adhesion depending on the conditions to which the tubes are subjected during use.

In one specific embodiment of forming an adhesive-coated membrane for wrapping into a tube of the present invention, an expanded PTFE membrane may be coated with a layer of, for example, FEP or another thermoplastic polymer, then the coated membrane is heated to a temperature above the melting point of the thermoplastic polymer and stretched while maintaining the temperature above the melting point of the thermoplastic polymer, then the coated membrane is cooled. The adhesive coating on the expanded PTFE membrane may be either continuous or discontinuous, depending primarily on the amount and rate of stretching, the temperature during stretching, the thickness of the adhesive, etc.

Figure 10A:
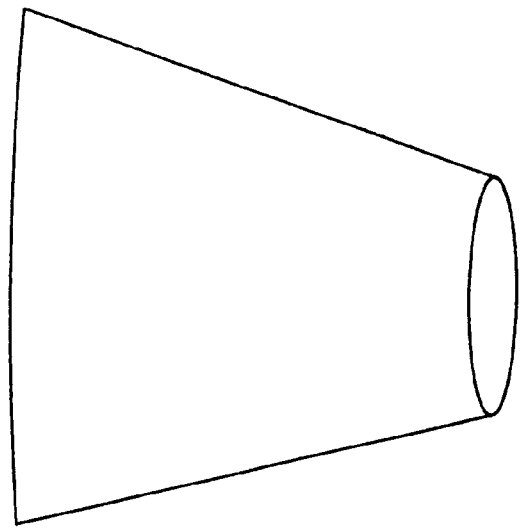
FIGS. 10A and 10B are perspective views of frustum and conical shaped tubes, respectively, of the present invention.
Figure 10B:
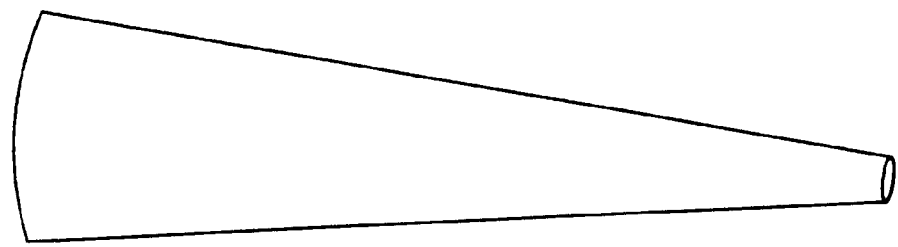

Though it is a preferred embodiment of the present invention to fabricate tubes having a circular cross-section using cylindrical mandrels, the mandrel may have any continuous cross-sectional shape, including rectangular, triangular, oval, hexagonal, and the like. In a further embodiment of the present invention, the mandrel may be tapered, as in a frustum, cone or the like, as shown in FIGS. 10A and 10B, respectively, to produce a tube having open ends of differing diameters from one end to the other.

Figure 11:
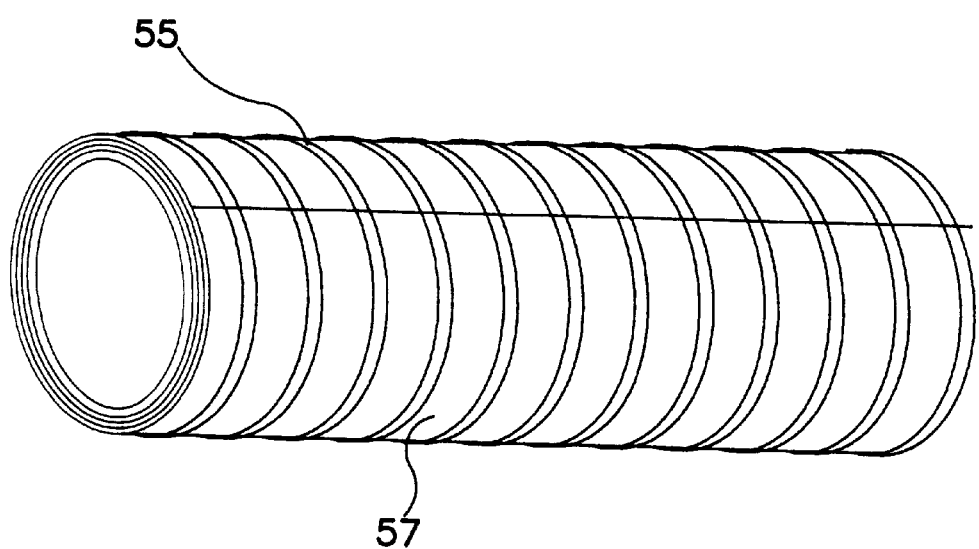
FIG. 11 is a side view of a tube of the present invention incorporating a helical rib.

In a further embodiment of the present invention, the flexible fluoropolymer tube may optionally incorporate reinforcing ribs which serve as, for example, additional strength members or to impede the collapsibility of the tube. The ribs may be either longitudinally oriented, in cases where additional axial strength may be desirable, or circumferentially or helically in cases where diametrical collapse is undesirable or increased diametrical strength is required. FIG. 11 shows a tube 57 of the present invention having helical ribs 55 incorporated therein. Circumferentially oriented ribs may be in the form of separate rings or helically wrapped fiber or wire. The reinforcing ribs may be of any material capable of withstanding the heating cycle required to fabricate the flexible fluoropolymer tube. Suitable rib compositions include, but art not limited to, metal, full density PTFE, expanded PTFE, densified expanded PTFE, FEP, PFA, PEEK, polyimides, and polyamides. These ribs may be incorporated into or attached to the tube during construction, and may be located on the exterior surface of the tube, on the internal surface of the tube, or between the layers of membrane. In a further embodiment, the reinforcing ribs may be affixed to the fluoropolymer tube after formation.

In a further alternative embodiment of the present invention, a reinforcing braid, such as one or more braided expanded PTFE fibers wrapped circumferentially or helically, may be incorporated between the layers of the fluoropolymer membrane.

Moreover, depending on the end application, it may be desirable to provide any number of surface textures, geometries (e.g., corrugations, tabs, etc.) to the flexible fluoropolymer tube of the present invention.

As mentioned earlier herein, compression may be used to alter the porosity of the tube. Such compression techniques may be selectively applied, such as through the use of a patterned roller, to incorporate desired surface textures, geometries, corrugations, etc., to the novel tubes of the present invention.

Figure 12C:
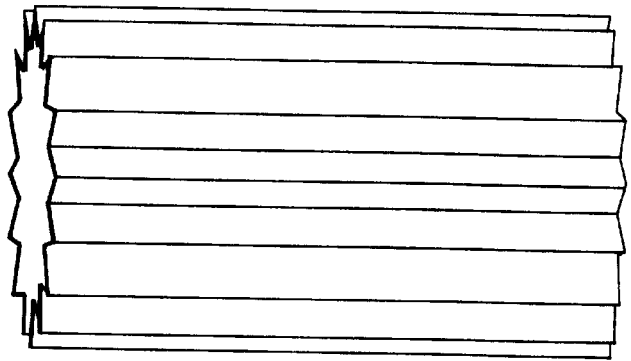
FIGS. 12A–12C are perspective views of tubes of the present invention having helical, circumferential and longitudinal corrugations, respectively.
Figure 12B:
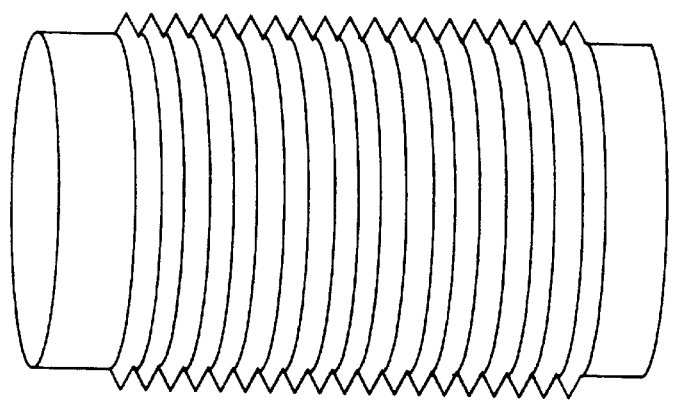
Figure 12A:
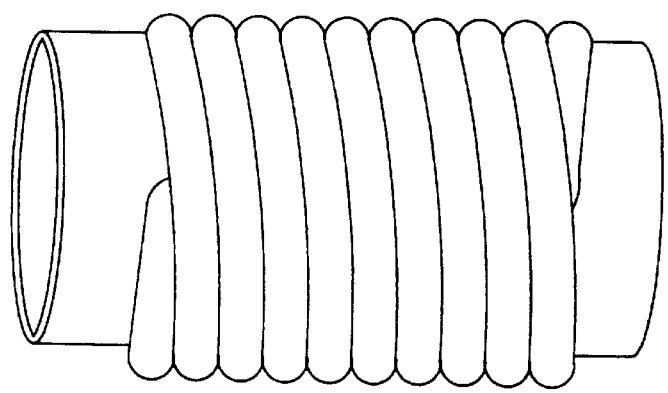
Figure 13A:
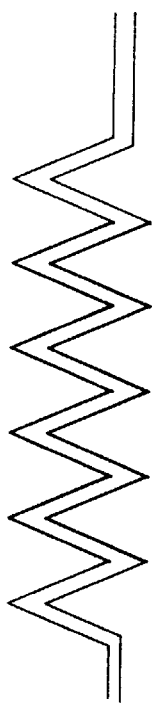
FIGS. 13A–13C are partial side cross-section views of angled, rounded and squared corrugation geometries, respectively, which may be formed in the corrugated tubes of the present invention.
Figure 13B:
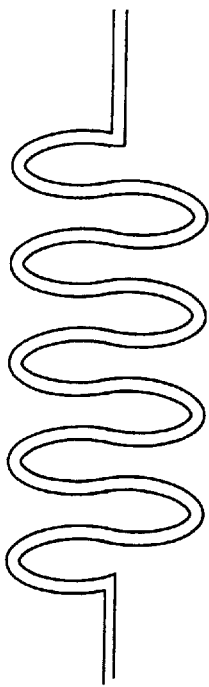
Figure 13C:
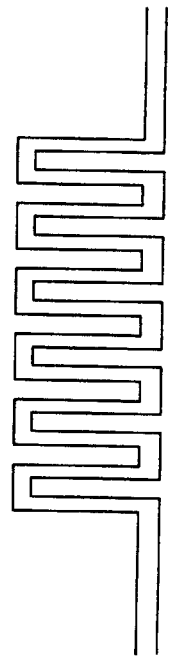

The incorporation of corrugations, convolutions, or other surface geometries, into the tubes of the present invention may provide significant performance advantages in a number of end use applications. For convenience, the term "corrugated" shall be used herein to refer to any corrugations, convolutions, patterns or other geometries which may be incorporated into the tubes of the present invention. For example, the addition of circumferentially oriented corrugations may assist in maintaining the internal diameter of the tube during axial, angular or lateral displacement of one part of the tube relative to another part of the tube, and can provide some radial resistance to collapse. Longitudinally oriented corrugations may be provided to assist in circumferential collapse. FIGS. 12A–12C show corrugated tubes having helical, circumferential and longitudinal corrugations, respectively, which may be fabricated in the present invention. Such corrugations could be incorporated into an existing expanded PTFE membrane tube fabricated, as described earlier, through conventional compressing techniques to form the corrugations in the wall of the tube. For example, as suggested earlier, corrugations may be added to the tube through compression between a pair of rollers having a series of interlocking grooves oriented about their circumference. Corrugations may also be added by creating circumferential creases or folds within the wall of the tube, or creating a helical crease in the wall of the tube. Depending on, for example, the compressive forces applied, the temperature of the tube, the means imparting the corrugations, and the like, the corrugated regions may be more dense than the remainder of the tube, thus providing enhanced rigidity to the tube wall. Moreover, depending on the desired end use of the corrugated tubes of the present invention, the configuration of the corrugations may range from angled corrugations to rounded corrugations to square corrugations, as shown in partial side cross-sectional view in FIGS. 13A 13B, and 13C, respectively.

In one embodiment for manufacturing a corrugated tube of the present invention, a formed flexible wrapped fluoropolymer tube may be placed about a mandrel having a series of grooves encircling its surface, and a cavity mold or molds having a matching groove pattern on the interior could be placed about the exterior of the tube and used to compress the tube against the mandrel to form corrugations in the wall of the tube.

A preferred method of incorporating corrugations in the novel tubes of the present invention is by first heating the expanded PTFE membrane wrapped tube to achieve intra-layer bonding, followed by expanding the tube radially into a mold having an interior geometry corresponding to the desired exterior geometry of the tube. The radial expansion of the tube may preferably be achieved by creating a higher pressure between the tube wall and the mandrel than the pressure between the tube wall and the mold through the use of air pressure, vacuum or the like. For example, in a particularly preferred embodiment, a tube having corrugations in at least a portion thereof, such as may be used as a bellows, conduit, or the like, in an end use application, may be formed by the following method. Specifically, an expanded PTFE membrane may be wrapped about a perforated mandrel and clamped in place about the ends, as described earlier. The expanded PTFE wrapped mandrel may then be enclosed in a cylindrical mold chamber having a series of circumferentially oriented grooves on the interior wall of the mold chamber. The assembly of the mold chamber and expanded PTFE wrapped mandrel are heated to a temperature above about 327° C. for a period of time which facilitates intra-layer bonding of the layers. Pressurized air is then applied to the interior of the tube through the perforated mandrel, which forces the wall of the tube away from the surface of the mandrel and forces it against the surface of the mold having the circumferentially oriented grooves. The assembly is then cooled, preferably with the air pressure being maintained during the cooling process until a temperature is reached where the tube maintains the geometries imparted by the mold and/or the mold has cooled to a temperature where it can be disassembled to remove the tube.

Figure 14:
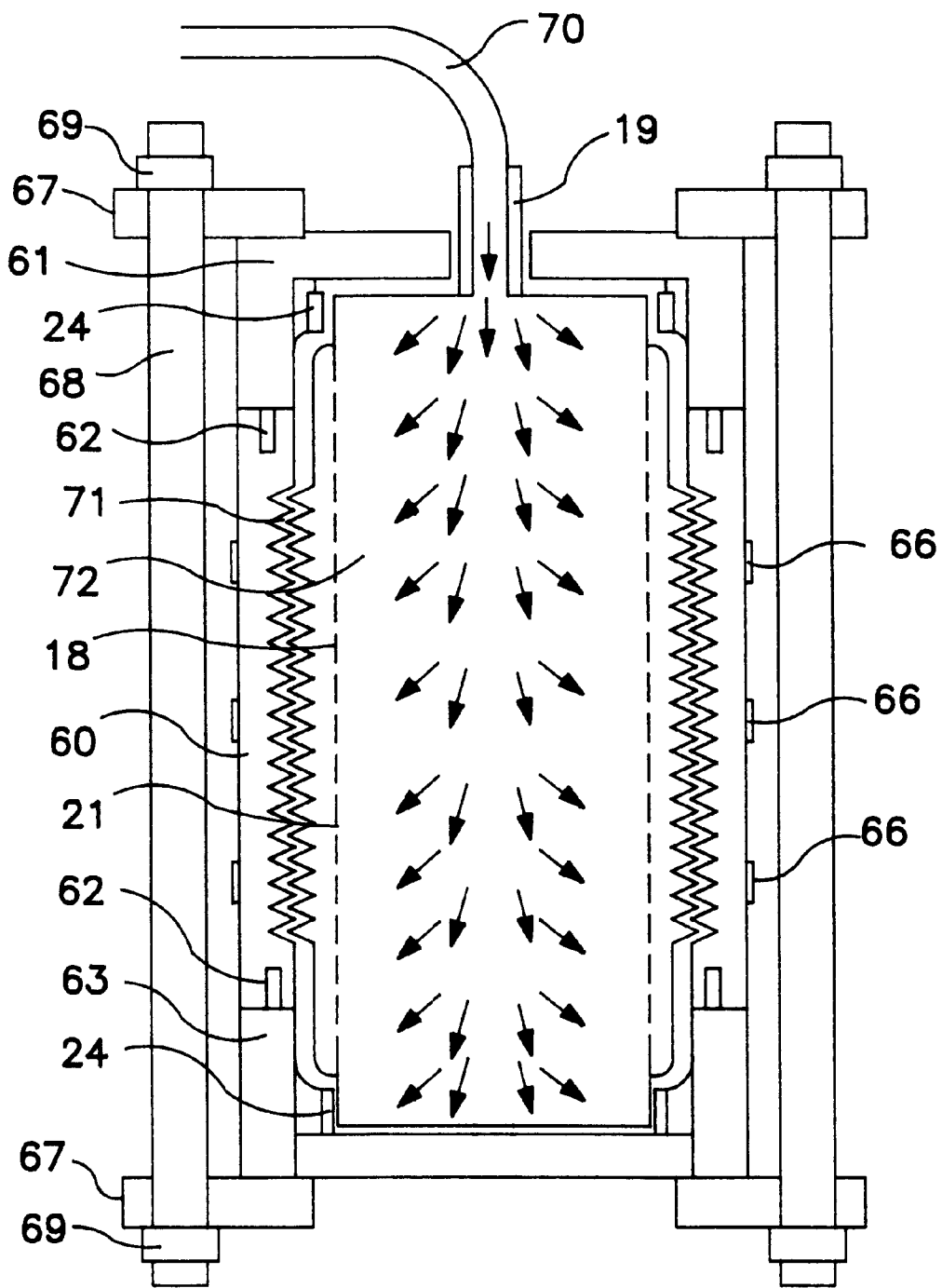
FIG. 14 is a perspective view of one embodiment of a tube molding assembly of the present invention.

FIG. 14 illustrates an exemplary molding arrangement used to fabricate a corrugated expanded PTFE membrane wrapped tube of the present invention. The membrane wrapped mandrel 18 with perforations 21 and having hose clamps 24 encircling the ends, is enclosed in a mold comprising a two-part cylindrical female mold 60 having corrugations in the inner wall. Top end cap 61 and bottom end cap 63 having dowels 62 that enter the female mold 60 at the ends for the purpose of alignment are used to encompass the ends of the mandrel 18. The top end cap 61 has a hole that permits the passage of the air line interconnect 19. Hose clamps 66 are tightened about the perimeter of the mold 60 to provide circumferential support during the pressurization step. The end caps 61, 63 and mold 60 are clamped down in the axial direction using annular flanges 67 bolted together using threaded tie rods 68 and hexagonal nuts 69. An air line 70 is connected to the air line interconnect 19. The entire assembly is placed in an oven where the temperature and heating cycle duration are adjusted to achieve at least partial intra-layer bonding between the layers of expanded PTFE and any other optional materials which may be incorporated within the wrap, such as adhesives or thermoplastic films. Pressurized air 72 is supplied to the interior of the mandrel 18 via the air line 70, resulting in the expansion of the layered tube wall 71 away from the perforated mandrel 18 and into the corrugations of the mold 60. The pressure is maintained while the mold and article cool to a temperature where the corrugations or other geometries imparted onto the tube wall as a result of compaction against the surface of the mold are maintained. The mold 60 and end caps 61, 63 are removed, and the resulting corrugated tube is removed from the mandrel 18.

In an alternative embodiment, the expanded PTFE membrane may be wrapped about a perforated mandrel having a desired geometry on its surface. A vacuum line may be provided within the mandrel to evacuate air and, upon heating of the tube, the vacuum line could be used to draw the expanded PTFE membrane wrapped tube against the surface of the mandrel and into any recessed regions or indentations in the mandrel. After cooling, the tube could be removed from the mandrel by any suitable technique, such as blowing air and sliding from the surface of the mandrel, providing a collapsible mandrel as described earlier herein, etc.

In a further alternative embodiment of the present invention, as mentioned earlier herein, one or more layers of the flexible fluoropolymer tube may comprise materials other than the expanded PTFE to provide desired properties to the flexible tube. For example, one or more sheet-like elements, such as polymeric films, metal foils, metal screens, or the like, may be provided in or on the flexible tube to provide enhanced properties to the resulting tube.

Depending on the desired application of the novel tubes of the present invention, the properties of the tubes may be tailored to meet any number of specific needs. For example, gas impermeability, liquid impermeability or increased resiliency may be imparted to the tubes by any number of techniques. For example, a plastic material having gas and water impermeability may be applied to the tubes by coating the interior or exterior, or by impregnating the entire article after formation of the tubes. Such plastic materials may comprise, for example, FEP, fluorine resins such as a copolymer of tetrafluoroethylene and perfluoroalkyl vinyl ether, fluorinated and perfluorinated rubber, natural gum rubber, natural latex rubber, polyurethane, silicone rubber, neoprene, EPDM, polyimide, polyester, nylon, polyvinyl chloride, polyethylene, and the like.

In a further embodiment of the present invention, it has been unexpectedly discovered that by incorporating one or more layers of material having lower porosity than the expanded PTFE membrane at suitable locations within the wrap, the tube wall characteristics such as density and rigidity can be selectively imparted to varying regions within the tube wall cross-section during the molding process. Such strategically placed layers of material, referred to generally herein for convenience as "shape-assisting layers" incorporated at some point during the wrapping of the expanded PTFE membrane to form the tube may provide a means for molding tubes having enhanced shapes or properties.

As mentioned above, the shaping-assisting layer may comprise a layer of material which has a porosity less than that of the expanded PTFE membrane wrapped about the mandrel. More specifically, shape-assisting layers include materials that are thermally stable and conformable at the temperatures required for the molding process and which have or produce a layer or region with a lesser porosity than the layered expanded PTFE membrane(s). For example, shape assisting layers that substantially maintain their dimensional stability at the temperatures used for molded tube formation include, but are not limited to, less porous expanded PTFE, full density PTFE films, polyimide films, etc. Alternatively, the shape-assisting layer may comprise a sheet or coating of FEP, PFA, liquid crystal polymer, or other material which may become at least partially molten during the fabrication process of the molded tube. The shape-assisting layer may have any thickness contemplated to achieve the desired end geometry. Without wishing to be bound by theory, it is believed that the lower the porosity of the shapeassisting layer, the greater the compressive force which is applied to the layers of expanded PTFE during molding, thus enhancing the shaping of the tube during the molding process.

The shape-assisting layer may be present as an inner layer adjacent or near the mandrel onto which the expanded PTFE layers are wound for the fabrication of a substantially evenly densified wall of expanded PTFE. Alternatively, in, for example, a blow molding assembly, the shape-assisting layer may be incorporated as an intermediate layer between a series of expanded PTFE membrane wraps, resulting in tubes having smooth walled, optionally porous, interiors in the region between the mandrel and the shape-assisting layer, and more defined molded exteriors with reduced porosity between the shape-assisting layer and the interior of the mold. Particularly, by providing the shape-assisting layer at some point within the wrapped film of expanded PTFE, it is believed that the shape-assisting layer enhances the compression of the outer layers of expanded PTFE during blow molding, while the interior layers of wrapped expanded PTFE inside the shape assisting layer are not compressed as tightly as the exterior layers, thus resulting in no or minimal shaping, or creating less defined corrugations, or other shapes, on the interior of the tube.

As described above, the novel tubes of the present invention may be tailored to have virtually any desired surface geometries, density, rigidity or thickness, either in selection portions or throughout the tubes, to meet the specifications of an unlimited number of desired end use application, and to provide enhanced performance during industrial service, mechanical service, etc. By optimizing the configuration of the expanded PTFE membranes used to form the tubes of the present invention, the thickness of the tube to be formed based on the number of wraps of expanded PTFE membrane, the processing conditions for formation of the tubes, etc., it is possible to achieve virtually any desired combination of features to suit a specific need.

The following examples are intended to illustrate, but not to limit, the present invention.

EXAMPLE 1

A perforated mandrel was fabricated by drilling 675 evenly spaced holes into the surface of a 127 mm diameter, 406 mm length steel tube, closing one end of the tube with a steel plate having equal diameter and fitting the other end with a steel plate having a connection in the center for attaching an air line. A partially sintered membrane of porous expanded PTFE produced via biaxial expansion, as described in U.S. Pat. Nos. 3,953,566 and 3,962,153 to Gore, having a microstructure comprised of node interconnected by fibrils, and having a thickness of 0.04 mm (0.0015 in.) was wrapped circumferentially about the mandrel to achieve a 90 layer thickness, while care was taken to assure that no visible wrinkles occurred between the layers of membrane during the wrapping process in order to achieve uniform surface bonding. The partially sintered membrane was tacky in nature, and the last layer of the wrap was pressed evenly against the underlying layers to assure contact during the heating cycle. Hose clamps were used to clamp the porous film in place about the diameter of the mandrel at each end. The expanded PTFE wrapped mandrel was placed in an oven at a temperature of about 360° C. for a period of one hour, then removed from the oven, and a pressurized air line was attached to the port at the top of the mandrel. After allowing the material to cool to ambient temperature, air was delivered to the interior of the mandrel until a pressure of about 170 kPa was achieved, resulting in the release of the expanded PTFE tube from the surface of the mandrel. The hose clamps were removed from the ends of the expanded PTFE wrapped tube, and the porous expanded PTFE film tube was easily removed from the mandrel. The flexible expanded PTFE tube had a wall thickness of 2.9 mm, an internal diameter of 127 mm and a density of 0.602 g/cm$^3$.

EXAMPLE 2

A perforated mandrel was fabricated by drilling 99 evenly spaced holes into the surface of a 38 mm diameter, 450 mm length steel tube. A steel disk having an outer diameter near that of the internal diameter of the steel tube was inserted into each end of the mandrel and welded in place. A ¼ inch (6.4 mm) national pipe thread standard threaded hole was drilled into the center of one of the disks into which a fitting for an air line attachment was inserted and fixed in place. A partially sintered membrane of porous expanded PTFE having a thickness of 0.04 mm (0.0015 in.), and a width of approximately 560 mm and formed as described in Example 1 was wrapped about the aforementioned mandrel to achieve a 32 layer thickness, while care was taken to assure that no visible wrinkles existed between the layers of membrane during the wrapping process in order to achieve uniform surface bonding. The membrane was tacky, and the last layer of the wrap was pressed evenly against the underlying layers to assure contact during the heating cycle. Hose clamps were used to clamp the porous film in place about the diameter of the mandrel at each end. The expanded PTFE wrapped mandrel was placed in an oven at a temperature of 360° C. for a period of one hour. It was then removed from the oven and a pressurized air line was attached to the port at the top of the mandrel. After allowing the material to cool to 23° C., air was delivered to the interior of the mandrel until a pressure of about 170 kPa was achieved, resulting in the release of the expanded PTFE tube from the surface of the mandrel. The flexible expanded PTFE wrapped tube had a wall thickness of 1.03 mm, an internal diameter of 38 mm and a density of 0.584 g/cm$^3$. This tube was cut into the four tubes used in the flex testing performance comparison described below.

The flexible fluoropolymer tubes of the present invention demonstrate utility in high flex applications where elastomeric materials are often used. Flex testing of flexible porous expanded PTFE tubes as compared to various elastomeric tubes (elastomers commonly used in high flexibility applications) was conducted upon tubing samples having a wall thickness between 1 mm and 1.5 mm, and a length of approximately 76 mm. The test was most representative of the axial compression and recovery flexing that is witnessed by tubular elements coupled onto vibrating industrial screening and transport equipment.

Figure 15:
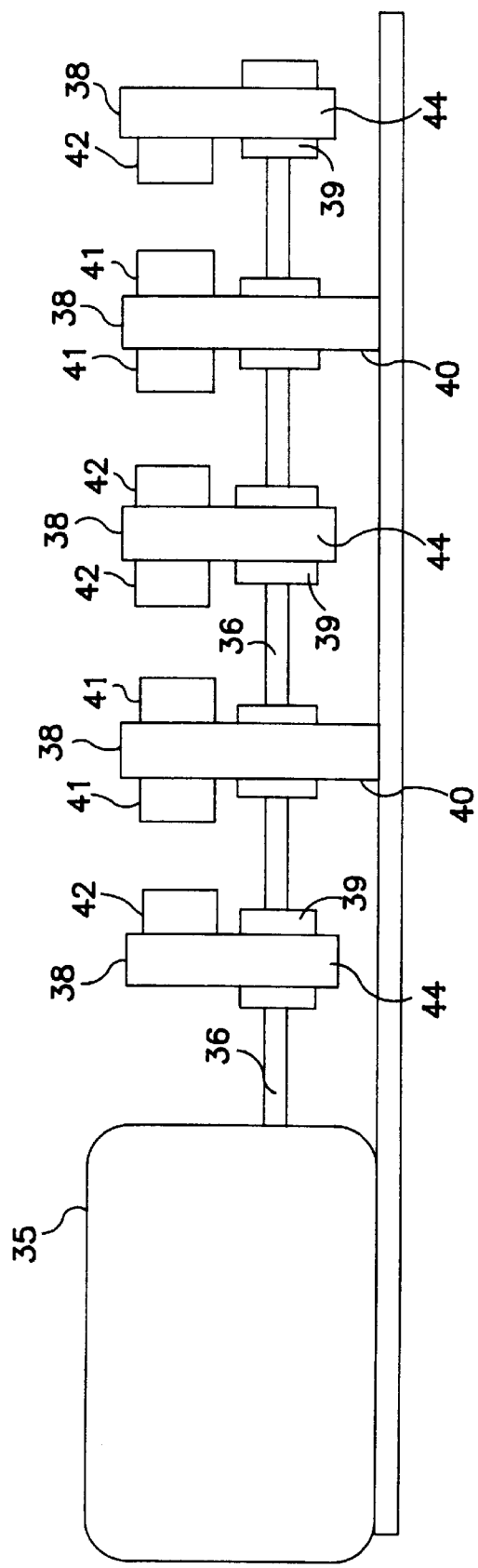
FIG. 15 is a profile view of the modified Newark flex testing apparatus used to evaluate the flex life of tubes during continuous compression/expansion cycling in the axial direction.

A Newark flex testing machine was modified as shown in FIG. 15 through the addition of piston assemblies 38 that were connected to the original pistons 39 attached to piston rod 36. Similar piston assemblies were attached to the fixed pistons 40. The pistons of both the fixed piston assemblies and those connected to the piston rod were in axial alignment, producing regions between the opposing pistons onto which the tubing sections were coupled, one piston being fixed 41, and the other capable of axial movement relative to the fixed piston 42. The motor 35 cyclically moves the piston rod 36 and the attached piston assemblies 38 in the axial direction, with a stroke length of 32 mm at a rate of about 8.7 cycles per second.

Figure 16:
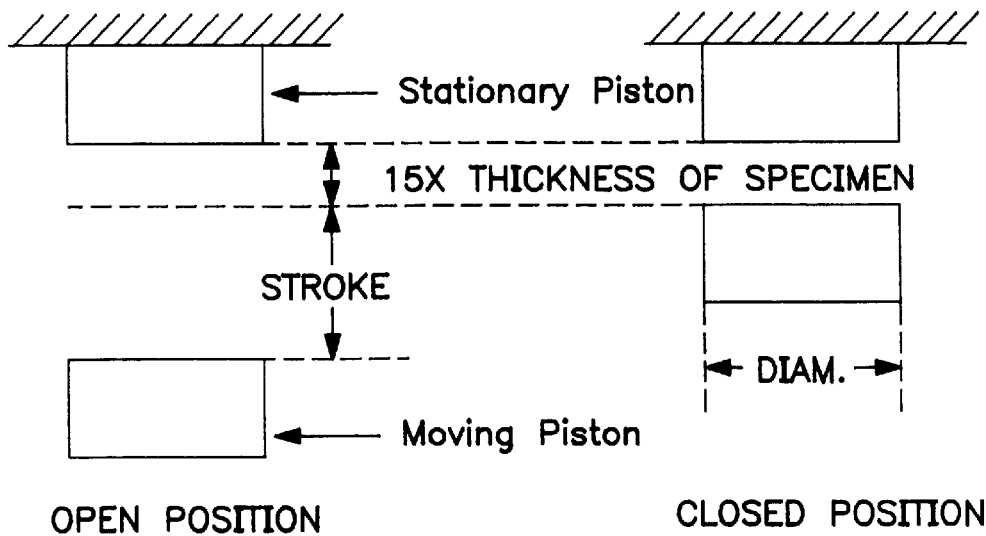
FIG. 16 is a perspective view of the schematics of the flex testing set-up used in testing materials in accordance with the present invention.

The flexural endurance of the samples was tested in accordance with ASTM D2097-69. FIG. 16 is a schematic of the distances for attaching the tubing samples to the apparatus, having a piston distance adjusted to 15× the specimen thickness while in the closed position.

The elastomeric samples tested were all cut from sections of tubing fabricated by The Belko Corporation (Kingsville, The table provided below shows the performance results of a variety of materials upon testing.

Flex Testing of Expanded PTFE Film Tube and Elastomeric Tubing
(Modified ASTM 2097-69)

| Material | Mean Stress at Peak (kPa) ASTM D638M-84 | % Strain at Break ASTM D638M-84 | Durometer Hardness (Shore A) | Tubing Sample Number | Mean Wall Thickness, (mm) | Total Flex Cycles Completed |
|---|---|---|---|---|---|---|
| Natural Rubber (Cpd. 4501) | 1906 | 423 | 29 | 1 | 1.50 | 1,400,000 (fail) |
| | | | | 2 | 1.51 | 1,200,000 (fail) |
| | | | | 3 | 1.50 | 800,000 (fail) |
| | | | | 4 | 1.50 | 1,000,000 (fail) |
| Neoprene (Cpd. 3854) | 16250 | 431 | 61 | 1 | 1.05 | 2,600,000 (fail) |
| | | | | 2 | 1.06 | 1,200,000 (fail) |
| | | | | 3 | 1.04 | 1,000,000 (fail) |
| | | | | 4 | 1.06 | 600,000 (fail) |
| SBR (Cpd. 4597) | 7449 | 408 | 48 | 1 | 1.05 | 200,000 (fail) |
| | | | | 2 | 1.05 | 1,800,000 (fail) |
| | | | | 3 | 1.06 | 800,000 (fail) |
| | | | | 4 | 1.06 | 1,400,000 (fail) |
| EPDM (Cpd. 3889) | 4265 | 534 | 46 | 1 | 1.01 | 200,000 (fail) |
| | | | | 2 | 1.03 | 1,600,000 (fail) |
| | | | | 3 | 1.02 | 800,000 (fail) |
| | | | | 4 | 1.03 | 200,000 (fail) |
| Urethane Rubber (Cpd. 3572) | 25540 | 695 | 60 | 1 | 1.05 | 10,000,000 (pass) |
| | | | | 2 | 1.05 | 400,000 (fail) |
| | | | | 3 | 1.05 | 7,600,000 (fail) |
| | | | | 4 | 1.06 | 1,200,000 (fail) |
| Nitrile Rubber (Cpd. 3960) | 7500 | 524 | 52 | 1 | 1.04 | 600,000 (fail) |
| | | | | 2 | 1.04 | 600,000 (fail) |
| | | | | 3 | 1.02 | 1,000,000 (fail) |
| | | | | 4 | 1.04 | 1,400,000 (fail) |
| Silicone Rubber (Cpd. 4447) | 5796 | 242 | 55 | 1 | .95 | 6,200,000 (fail) |
| | | | | 2 | .94 | 5,400,000 (fail) |
| | | | | 3 | .93 | 1,400,000 (fail) |
| | | | | 4 | .96 | 3,800,000 (fail) |
| Expanded PTFE Film Tube | 24575 | 40.9 | 53 | 1 | 1.03 | 10,000,000 (pass) |
| | | | | 2 | 1.03 | 10,000,000 (pass) |
| | | | | 3 | 1.02 | 10,000,000 (pass) |
| | | | | 4 | 1.03 | 10,000,000 (pass) |

Md.). Four 76 mm samples were cut from each of the seven elastomeric materials tested, including styrene butadiene rubber (SBR) type 4597, ethylene propylene diene monomer (EPDM) type 3889, neoprene type 3854, urethane rubber type 3572, natural rubber type 4501, nitrile rubber type 3960, and silicone rubber type 4447. The samples were clamped into place about the pistons without stretching using hose clamps at the maximum distance apart. Samples were flexed in this fashion for 200,000 cycle intervals, between which the specimens were examined for cracks and regions of abrasion resulting from flex fatigue. Samples were removed from the flex tester when they exhibited cracks or holes passing completely through the wall of the sample, and were recorded as failing.

Figure 17:
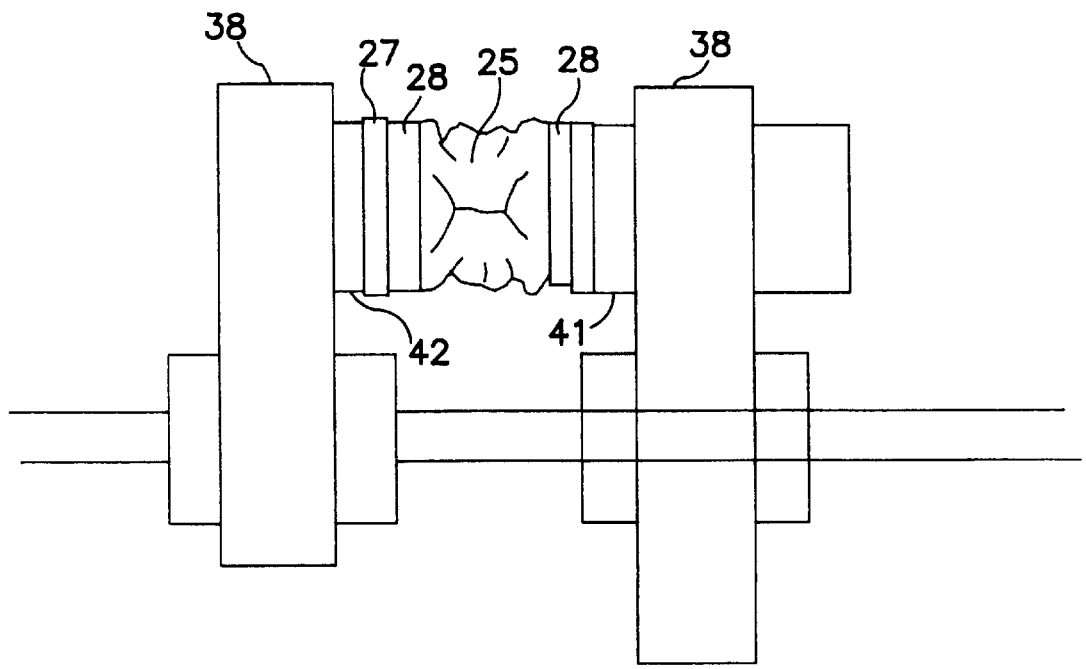
FIG. 17 is a perspective view of a tube positioned in the flex testing apparatus of FIG. 15 in a flexed state.

FIG. 17 shows a close-up of one of the piston assemblies of FIG. 15 with a tube sample 27 affixed into the apparatus using hose clamps 28. Flexing action of the pistons results in a creasing pattern 25 in the tube sample 27. The repeated flexing results in regions of abrasion or cracking in the folding regions, which eventually leads to the formation of holes in the wall of the tube. Many polymeric and elastomeric materials abrade during the course of the flexing witnessed during use. The particulates that abrade from the tube are often a source of contamination for products passing through the tube, as well as a source of contamination in the environment outside the tube.

It should be noted that when full density PTFE fabricated through paste extrusion and having a wall thickness of 1.0 mm was flexed by hand in a fashion comparable to the test established for the materials in the table, the full density PTFE failed rapidly due to its rigid nature.

EXAMPLE 3

An 0.04 mm film of expanded PTFE, as described in Examples 1 and 2, was coil wrapped about the 38 mm diameter mandrel described in Example 2, to a thickness of three layers. A 44 mm wide, 0.09 mm thick, two-layer composite tape comprising expanded PTFE membrane fabricated as described in U.S. Pat. Nos. 3,953,566 and 3,962,153 to Gore, and FEP film obtained from E.I. du Pont de Nemours and Company (Wilmington, Del.) under the trade name Teflon® FEP Film 50A was then helically wrapped about the mandrel having an overlap of about 15 mm between the adjacent layers of the wrap.

The composite tape was made by:
a) contacting the expanded PTFE membrane with the FEP;
b) heating the composition obtained in step a) to about 335° C.;
c) stretching the heated composition of step b) while maintaining the temperature above the melting point of the thermoplastic polymer; and
d) cooling the product of step c).

A second helical wrap of the FEP/expanded PTFE composite was performed in a direction opposite the direction of the first layer of composite, having an overlap of about 15 mm. Six more alternating wraps of the composite film were performed, each film being wrapped in the opposite direction of the prior wraps. Hose clamps were used to clamp the porous film in place about the diameter of the mandrel at each end. The expanded PTFE wrapped mandrel was placed in an oven at a temperature of 340° C. for a period of one hour, then removed from the oven, and a pressurized air line was attached to the port at the top of the mandrel. After allowing the material to cool to about 23° C., pressurized air was delivered to the interior of the mandrel until a pressure of 170 kPa was achieved, resulting in the release of the expanded PTFE tube from the surface of the mandrel. The PTFE film tube had a wall thickness of 1.52 mm, an internal diameter of 38 mm, and a density of 0.766 g/cm$^3$.

EXAMPLE 4

An expanded fluoropolymer wrapped tube having an internal, helically oriented reinforcing rib was produced using the perforated mandrel of Example 1. Fifty layers of 0.04 mm thick biaxially expanded PTFE film produced using methods taught in U.S. Pat. Nos. 3,953,566 and 3,962,153 were wrapped about the perforated mandrel. A single layer of 0.127 mm thick film of PFA obtained from E.I. duPont de Nemours and Company under the trade name Teflon® PFA Film 500LP, was wrapped on top of the expanded PTFE with an overlap of about 40 mm. A 1.2 mm stainless steel wire was helically wrapped in a spring-like fashion about the surface of the PFA film, each wrap spaced approximately 15 mm apart. An additional layer of 0.127 mm thick PFA film was wrapped on top of the wire, with an overlap of about 40 mm. Fifty layers of the 0.04 mm thick expanded PTFE was then wrapped on top of the PFA film. Hose clamps were used to clamp the layers in place about the diameter of the mandrel at each end. The porous expanded PTFE membrane wrapped mandrel was placed in an oven at a temperature of about 360° C. for a period of one hour, then removed from the oven, and a pressurized air line was attached to the port at the top of the mandrel. After cooling to approximately 200° C., pressurized air was delivered to the interior of the mandrel until a pressure of about 340 kPa was achieved, resulting in the release of the porous PTFE tube from the surface of the mandrel. The hose clamps were removed from the ends of the PTFE film wrapped mandrel, and the porous PTFE wrapped tube was easily removed from the mandrel. The resulting expanded PTFE tube had a wall thickness of 4.4 mm, an internal diameter of 38 mm, and a length of 370 mm.

EXAMPLE 5

A 0.04 mm. thick membrane of expanded PTFE as described in Example 1 was wrapped continuously about the perforated mandrel described in Example 1 to a thickness of 60 layers.

A mold was cut from a 20.3 cm outer diameter, 15.2 cm inner diameter tube of aluminum having 18 12.7 mm deep 'V'-shaped circumferential grooves cut into the inner wall, such as shown in cross-section FIG. 14. The aluminum tube was cut longitudinally into two halves, producing a two-part mold. End caps were produced having inner diameters of about 20.3 cm to fit over the mold when assembled, the top one having a hole to expose the air line interconnection on the top of the mandrel.

The wrapped mandrel was placed into the bottom end cap and the corrugated two-part mold and top end cap were put assembled, encompassing the mandrel. To provide radial support during the molding process, three hose clamps spaced evenly encircling the outer diameter of the mold were added. The mold and mandrel assembly was clamped down in the axial direction between two flanges connected using four threaded tie rods and hex. nuts. The mold and mandrel assembly was placed into an oven, and a stainless steel air line tubing was connected to the interconnect on the mandrel through a hole in the top of the oven. The oven was set to 365° C. and the temperature within the oven ramped from about 23° C. to 365° C. in about 20 minutes. After 120 minutes at 365° C., pressurized air was supplied to the interior of the mandrel through the air line to achieve an internal pressure of 50 psia, resulting in the expansion of the laminated film into the grooves of the mold. The air pressure was maintained while the oven temperature was turned down to room temperature. When the mold and mandrel assembly had cooled to under about 50° C., it was removed from the oven and the air pressure was discontinued. The mold was disassembled, and the formed corrugated expanded PTFE tube was removed. The resulting tube had essentially the same exterior dimensions as the interior dimensions of the mold, and a wall thickness of 1.75 mm.

To determine the minimum internal vacuum which the corrugated tube could sustain prior to collapse, both non corrugated ends of the corrugated tube of this example were clamped about the perimeter of 15 cm diameter aluminum cylinders, separated from each other by 16 cm. One of the 15 cm diameter cylinders had a hole through it by which air could slowly be evacuated from the interior of corrugated tube, and the amount of the vacuum pulled could be measured. The vacuum reading noted upon the collapse of the corrugated tube was approximately 12 cm of water.

EXAMPLE 6

A 0.04 mm thick membrane of expanded PTFE, as described in Example 1, was wrapped continuously about the perforated mandrel, as described in Example 1, to a thickness of 25 layers. A 0.127 mm thick sheet of PFA, as described in Example 4, was wrapped about the porous PTFE film, with an 80 mm longitudinal overlap region. Twenty five additional layers of the expanded PTFE membrane were wrapped onto the mandrel on top of the PFA film. The layers were clamped in place about the ends of the mandrel using hose clamps and placed in the corrugated mold described in Example 5. The mold was clamped down between the bolted flanges, the air line was connected to the port on top of the mandrel, and the entire assembly was placed in an oven, as described in Example 5. The oven was set to 365° C., (the oven temperature ramping from 23° C. to 365° C. in about 20 minutes). After 120 minutes at 365° C., pressurized air was sent to the interior of the mandrel to achieve an internal pressure of 50 psia, resulting in the expansion of the tube into the grooves of the mold. The pressure was maintained while the mold cooled to room temperature. The mold and mandrel assembly was removed from the oven and the air pressure was discontinued. The mold was disassembled and the resulting corrugated ePTFE tube with the PFA intermediated layer was removed from the mandrel.

The resulting tube had a 0.6 mm thick straight wall interior region comprised of the 25 inner wraps of expanded PTFE film, and a 0.2 mm thick corrugated exterior region comprised of the PFA layer and the compressed 25 outer PTFE film wraps. The tube had an internal diameter of approximately 150 mm, and eighteen 12 mm "V"-shaped corrugations corresponding to the geometry of the mold.

EXAMPLE 7

A 0.04 mm thick membrane of expanded PTFE and a 0.025 mm thick film of PFA were co-wrapped about the perforated mandrel described in Example 1. After three complete wrappings in this fashion, the PFA film was cut, and only the expanded PTFE film was wrapped about the perforated mandrel to provide 60 additional layers. The layers were clamped in place about the ends of the mandrel using hose clamps and placed in the corrugated mold. The mold was clamped down between the bolted flanges, the air line was connected to the port on top of the mandrel, and the entire assembly was placed in an oven. The oven was set to 365° C., requiring twenty minutes to ramp from 23° C. to 365° C. After 120 minutes at 365° C., pressurized air was sent to the interior of the mandrel to achieve an internal pressure of 60 psia, resulting in the expansion of the tube into the grooves of the mold. The pressure was maintained while the oven temperature was turned down to room temperature. When the mold and mandrel assembly had cooled to room temperature, it was removed from the oven and the air pressure was discontinued, the mold was disassembled and the corrugated ePTFE tube with the PFA co-wrapped interior was removed. The resulting tube was observed visually to be more rigid than the tubes produced in the earlier Examples. The tube formed in this example, when subjected to a vacuum to determine collapse, was found to collape under an internal vacuum of 64 cm of water using the vacuum test described in Example 5. The tube had a wall thickness of 0.71 mm, an internal diameter of approximately 150 mm, and eighteen 12 mm, "V"-shaped corrugations corresponding to the geometry of the mold.

EXAMPLE 8

A carbon-filled expanded PTFE corrugated tube was fabricated using a 0.25 mm thick expanded PTFE film containing 5% carbon black by weight. The membrane was produced by the methods described in U.S. Pat. Nos. 4,985,296 to Mortimer, Jr. Fifteen layers of this material were wrapped about the perforated mandrel described in Example 1. The layers were clamped in place about the ends of the mandrel using hose clamps. The mandrel was placed in the corrugated mold and subjected to the same heat cycling as outlined in Example 5.

The resulting tube had a wall thickness of 2.5 mm, internal diameter of approximately 150 mm, and eighteen 12 mm, "V"-shaped corrugations corresponding to the geometry of the mold.

EXAMPLE 9

A corrugated tube having an inner layer of full density PTFE and an exterior of expanded PTFE was fabricated using calendered paste extruded PTFE tape extrudate, formed as described in U.S. Pat. Nos. 3,953,566, 3,962,153, and 4,187,390 to Gore.

The PTFE tape extrudate having a density of 1.46 grams per $cm^3$, a thickness of 0.18 mm and a width of 150 cm was wrapped helically about the perforated mandrel described in Example 1 with a 3 cm pitch. Another PTFE extrudate tape was helically wrapped in the opposite direct with a 3 cm pitch on top of the first tape. Fifty layers of 0.04 mm biaxially expanded PTFE film, as described in Example 1, were longitudinally wrapped on top of the extrudate. The films were clamped in place about the ends of the mandrel using hose clamps. The mandrel was then placed in the corrugated mold and subjected to the same heat cycling as outlined in Example 5. The resulting tube had a wall thickness of 0.71 mm, internal diameter of approximately 150 mm, and eighteen 12 mm "V"-shaped corrugations corresponding to the geometry of the mold. This corrugated tube, upon visual observation, appeared to have a translucent, full density inner layer, and a relatively more porous expanded PTFE exterior.

EXAMPLE 10

Two layers of 0.05 mm thick, 66 cm wide sintered skived PTFE obtained from Fluoroplastic, Inc. (Philadelphia, Pa.) were longitudinally wrapped about the perforated mandrel described in Example 1. Fifty layers of 0.04 mm biaxially expanded PTFE membrane, as described in Example 1, were longitudinally wrapped on top of the skived layers. The films were clamped in place about the ends of the mandrel using hose clamps. The mandrel was placed in the corrugated mold and subjected to the same heat cycling outlined in Example 5.

The resulting had a wall thickness of 0.71 mm, internal diameter of approximately 150 mm, and eighteen 12 mm, "V"-shaped corrugations corresponding to the geometry of the mold.

EXAMPLE 11

A composite tape consisting of longitudinally expanded PTFE and FEP fabricated as described in Example 3, having a thickness of 0.19 mm and a width of 105 mm, was helically wrapped as a first layer with the FEP side facing away from the mandrel surface with approximately a 40 mm pitch about the perforated mandrel described in Example 1. The second layer of the composite tape was helically wrapped with the FEP side down onto the mandrel in a direction opposite the first layer. Five more helical layers of the composite tape were wrapped onto the mandrel with the same pitch as the first two, FEP side down, and with alternating wrapping directions. The composite tapes were clamped in place about the ends of the mandrel using hose clamps. The mandrel was placed in the corrugated mold as described in Example 5. The oven was set to 330° C., requiring seventeen minutes to ramp from about 23° C. to 330° C. After 160 minutes at 330° C., pressurized air was sent to the interior of the mandrel to achieve an internal pressure of 45 psia, resulting in the expansion of the laminated films into the grooves of the mold. The pressure was maintained while the oven temperature was turned down to room temperature. When the mold and mandrel assembly had cooled to room temperature, it was removed from the oven and the air pressure was discontinued, the mold was disassembled and the corrugated ePTFE/FEP composite tube was removed. The corrugated tube had a wall thickness of 1.2 mm, internal diameter of approximately 150 mm, and eighteen 12 mm, "V"-shaped corrugations corresponding to the geometry of the mold.

TEST METHODS

Density Measurement

Densities were calculated according to the Archimedean Principle whereby a density of a solid body is determined by using a liquid of known density. To this end, the article to be measured was first weighed in air and then immersed in the liquid of known density. Using these two weighings, the density of the solid body was calculated by the following equation:

$$\frac{A}{A-B}\rho o$$

wherein,
A=Weight of the solid body in air,
B=Weight of the solid body when immersed in test liquid, and
ρo=Density of the test liquid at a given temperature.

Although a few exemplary embodiments of the present invention have been described in detail above, those skilled in the art will readily appreciate that many modifications are possible without materially departing from the novel teachings and advantages which are described herein. Accordingly, all such modifications are intended to be included within the scope of the present invention, as defined by the following claims.

What is claimed is:

1. A flexible tube of layered expanded PTFE membrane comprising:
    a first layer of expanded PTFE membrane exhibiting a node and fibril structure comprising an inner surface and an outer surface;
    at least one subsequent layer of expanded PTFE membrane exhibiting a node and fibril structure comprising an inner surface and an outer surface;
    wherein each subsequent layer surrounds at least a portion of the outer surface of the immediately preceding layer; and
    wherein the inner diameter of said tube is greater than 25.4 mm.

2. The flexible tube of claim 1, wherein said layered expanded PTFE membrane is wrapped in at least one configuration selected from the group consisting of a helical wrap and a coiled wrap.

3. The flexible tube of claim 1, wherein said tube has a wall thickness of greater than 0.25 mm.

4. The flexible tube of claim 1, wherein said tube has at least one geometry selected from the group consisting of a uniform diameter from one end of the tube to the other, a frustrum geometry, and a non-uniform patterned geometry.

5. The flexible tube of claim 1, wherein said tube comprises a flexible connection for connecting at least one set of members selected from conduits, ducts and pipes.

6. The flexible tube of claim 1, wherein said tube comprises a protective covering to protect components from at least one of thermal, chemical and mechanical stresses.

7. The flexible tube of claim 1, wherein said tube further comprises at least one filler.

8. The flexible tube of claim 1, wherein said tube further comprises at least one second material interposed between at least one of the layers of the expanded PTFE membrane.

9. The flexible tube of claim 1, wherein said tube further comprises at least one reinforcing rib.

10. A method of forming a flexible tube of layered expanded PTFE membrane, comprising:
    providing a mandrel having a diameter greater than 25.4 mm with an exterior surface and at least one outlet to permit gas to flow to the exterior surface of the mandrel;
    wrapping at least two layers of expanded PTFE membrane exhibiting a node and fibril structure around the exterior surface of the mandrel;
    heating said mandrel and said expanded PTFE membrane to a temperature above the crystalline melting point of the fluoropolymer for a time sufficient to induce shrinkage and coalescence of the nodes and fibrils at the surface interface of the at least two layers, whereby said shrinkage and coalescence results in adhesion of the layers into a coherent tube of layered expanded PTFE membrane;
    blowing at least some gas through said outlet of the mandrel to separate the tube of expanded PTFE from the exterior surface of the mandrel; and
    removing said expanded PTFE tube from the mandrel.

11. The method of claim 10, wherein said wrapping of the at least two layers of expanded PTFE film is carried out in at least one of a coil wrap and a helical wrap.

12. The method of claim 10, further comprising providing at least one second material between the layers of expanded PTFE membrane.

13. A corrugated flexible tube of layered expanded PTFE membrane comprising:
    a first layer of expanded PTFE membrane comprising an inner surface and an outer surface;
    at least one subsequent layer of expanded PTFE membrane comprising a inner surface and an outer surface;
    wherein each subsequent layer surrounds at least a portion of the outer surface of the immediately preceding layer; and
    wherein said tube includes at least one corrugation in at least a portion thereof.

14. The corrugated flexible tube of claim 13, wherein said layered expanded PTFE membrane is wrapped in at least one configuration selected from the group consisting of a helical wrap and a coiled wrap.

15. The corrugated flexible tube of claim 13, wherein said expanded PTFE is at least partially densified.

16. The corrugated flexible tube of claim 13, wherein the at least one corrugation has at least one geometry selected from the group consisting of to angled corrugations, rounded corrugations and squared corrugations.

17. The corrugated flexible tube of claim 13, wherein the density of the tube varies in one region of the tube relative to another region of the tube.

18. The corrugated flexible tube of claim 13, wherein said tube further comprises a first end, a middle region and a second end, and wherein said middle region comprises corrugations and said first and second ends are uncorrugated.

19. The corrugated flexible tube of claim 13, wherein said at least one corrugation is selected from the group consisting of longitudinal corrugations, helical corrugations and circumferential corrugations.

20. The corrugated flexible tube of claim 13, wherein said tube further comprises at least one filler.

21. The corrugated flexible tube of claim 13, wherein said tube further comprises at least one second material interposed between at least one of the layers of the expanded PTFE membrane.

22. The corrugated flexible tube of claim 21, wherein said at least one second material has a lower porosity than the porosity of the layers of expanded PTFE material.

23. The corrugated flexible tube of claim 21, wherein said at least one second material comprises at least one material selected from the group consisting of FEP, PFA, liquid crystal polymer, and PTFE having a lower porosity than the porosity of the layers of expanded PTFE material.

24. The corrugated flexible tube of claim 13, wherein said tube comprises a flexible connection for connecting at least one set of members selected from the group consisting of conduits, ducts and pipes.

25. The corrugated flexible tube of claim 13, wherein said tube comprises a protective covering to protect components from at least one of thermal, chemical and mechanical stresses.

26. The corrugated flexible tube of claim 21, wherein said at least one second material is present on the exterior of the tube.

27. The corrugated flexible tube of claim 21, wherein said at least one second material is present on the exterior of the tube.

28. A corrugated flexible tube comprising
an outer region comprising corrugated layers comprising multiple wrapped layers of expanded PTFE membrane;
an inner region comprising multiple wrapped layers of expanded PTFE membrane; and
at least one layer of a second material sandwiched between and adhered to said outer region and said inner region, wherein said outer region has a lower porosity than the porosity of said inner region.

29. The corrugated flexible tube of claim 28, wherein said at least one second material comprises at least one material having a porosity lower than the porosity of the outer region.

30. The corrugated flexible tube of claim 28, wherein said at least one second material comprises at least one material selected from the group consisting of FEP, PFA, liquid crystal polymer, and PTFE having a porosity lower than the porosity of the outer region.

31. A method of forming a corrugated flexible tube of layered fluoropolymer membrane, comprising:
providing a mandrel with an exterior surface and at least one outlet to permit gas to flow to the exterior surface of the mandrel;
wrapping at least two layers of expanded PTFE membrane exhibiting a node and fibril structure around the exterior surface of the mandrel;
heating said mandrel and said expanded PTFE membrane layers to a temperature above the crystalline melting point of the fluoropolymer for a time sufficient to induce shrinkage and coalescence of the nodes and fibrils at the surface interface of the at least two layers, whereby said shrinkage and coalescence results in adhesion of the layers into a coherent tube of layered expanded PTFE membrane;
providing a mold having an internal geometry of corrugations spaced outwardly from said mandrel;
blowing at least some gas through said outlet of the mandrel to separate the expanded PTFE tube from the exterior surface of the mandrel force the tube into the internal geometry of the mold, thereby forming corrugations in the expanded PTFE tube; and
removing said corrugated flexible expanded PTFE tube from the mold.

32. The method of claim 31, wherein said wrapping of the at least two layers of expanded PTFE membrane is carried out in at least one of a coil wrap and a helical wrap.

33. The method of claim 31, further comprising providing at least one second material between two or more of the expanded PTFE membrane layers.

* * * * *